United States Patent
Eckhardt et al.

(10) Patent No.: US 8,927,914 B2
(45) Date of Patent: Jan. 6, 2015

(54) OPTICAL DEVICE

(75) Inventors: Reiner Eckhardt, Überlingen (DE);
Joachim Barenz, Überlingen (DE);
Hubert Kuppel, Stockach (DE)

(73) Assignee: Diehl BGT Defense GmbH & Co. KG,
Ueberlingen (DE)

( * ) Notice: Subject to any disclaimer, the term of this patent is extended or adjusted under 35 U.S.C. 154(b) by 299 days.

(21) Appl. No.: 13/493,065

(22) Filed: Jun. 11, 2012

(65) Prior Publication Data

US 2012/0312913 A1 Dec. 13, 2012

(30) Foreign Application Priority Data

Jun. 11, 2011 (DE) .......................... 10 2011 104 021

(51) Int. Cl.
*G02B 27/64* (2006.01)
*F41G 7/20* (2006.01)
*F41G 7/22* (2006.01)
*G02B 23/24* (2006.01)
*G02B 27/00* (2006.01)
*F41G 7/00* (2006.01)

(52) U.S. Cl.
CPC ............ *F41G 7/2213* (2013.01); *F41G 7/2253* (2013.01); *F41G 7/2293* (2013.01); *G02B 23/2446* (2013.01); *G02B 27/0018* (2013.01); *G02B 27/64* (2013.01)
USPC .......... 244/3.16; 244/3.1; 244/3.15; 359/362; 359/399; 359/429; 359/894

(58) Field of Classification Search
USPC ............ 244/3.1–3.3; 359/362, 399, 429, 430, 359/431, 894
See application file for complete search history.

(56) References Cited

U.S. PATENT DOCUMENTS

| | | | | |
|---|---|---|---|---|
| 4,010,365 A | * | 3/1977 | Meyers et al. ............... | 244/3.16 |
| 4,024,392 A | * | 5/1977 | Teppo et al. ................. | 244/3.16 |
| 4,030,807 A | * | 6/1977 | Briney ......................... | 244/3.16 |
| 4,036,453 A | * | 7/1977 | Evans et al. .................. | 244/3.16 |
| 4,039,246 A | * | 8/1977 | Voigt ............................ | 244/3.16 |
| 4,123,134 A | * | 10/1978 | Meyers ........................ | 244/3.16 |
| 4,155,096 A | * | 5/1979 | Thomas et al. .............. | 244/3.13 |
| 4,238,089 A | * | 12/1980 | Grosser ........................ | 244/3.13 |

(Continued)

FOREIGN PATENT DOCUMENTS

| | | |
|---|---|---|
| DE | 1921256 U | 8/1965 |
| DE | 1275414 B | 8/1968 |

(Continued)

*Primary Examiner* — Bernarr Gregory
(74) *Attorney, Agent, or Firm* — Laurence A. Greenberg; Werner H. Stemer; Ralph E. Locher (57) ABSTRACT

An optical device forms a beam path between an optical end element at a beam path end and an object scene into which the beam path is directed via a field of view of the end element. The optical device contains an alignment device for pivoting the field of view relative to a predetermined direction, an end optical unit and an optical articulation for guiding the beam path from the pivoted field of view into the end optical unit. In order to achieve good shielding against spurious radiation, the device has a shielding unit containing a shielding element led partly around the optical articulation, which shielding unit shields the optical articulation against incident radiation that is not incident through the entrance or exit aperture of the optical articulation.

17 Claims, 4 Drawing Sheets

(56) References Cited

U.S. PATENT DOCUMENTS

| | | | |
|---|---|---|---|
| 4,279,463 A * | 7/1981 | Little | 359/399 |
| 4,349,838 A * | 9/1982 | Daniel | 244/3.13 |
| 4,413,177 A * | 11/1983 | Godwin et al. | 244/3.16 |
| 4,952,042 A * | 8/1990 | Pinson | 359/429 |
| 5,039,215 A * | 8/1991 | Hirabayashi | 359/430 |
| 5,091,637 A * | 2/1992 | Edwards | 244/3.16 |
| 5,512,741 A | 4/1996 | Levaillant et al. | |
| 5,550,673 A * | 8/1996 | Goldstein | 359/431 |
| 5,592,331 A | 1/1997 | Eastcott | |
| 6,145,784 A * | 11/2000 | Livingston | 244/3.11 |
| 7,206,129 B2 * | 4/2007 | Hosoya | 359/431 |
| 2009/0040634 A1 | 2/2009 | Baumann | |
| 2010/0327105 A1 | 12/2010 | Eckhardt | |

FOREIGN PATENT DOCUMENTS

| | | |
|---|---|---|
| DE | 10135222 A1 | 2/2003 |
| DE | 102007019101 A1 | 10/2008 |
| DE | 102007035574 A1 | 2/2009 |
| DE | 10 2008 026 990 A1 | 12/2009 |
| DE | 10 2009 029 895 A1 | 1/2011 |
| FR | 2690997 A1 | 11/1993 |
| GB | 769444 A | 3/1957 |

* cited by examiner

OPTICAL DEVICE

CROSS-REFERENCE TO RELATED APPLICATION

This application claims the priority, under 35 U.S.C. §119, of German application DE 10 2011 104 021.1, filed Jun. 11, 2011; the prior application is herewith incorporated by reference in its entirety.

BACKGROUND OF THE INVENTION

Field of the Invention

The invention relates to an optical device for forming a beam path between an optical end element at a beam path end and an object scene into which the beam path is directed via a field of view of the end element. The optical device has an alignment device for pivoting the field of view relative to a predetermined direction, an end optical unit and an optical articulation for guiding the beam path from the pivoted field of view into the end optical unit.

Guided missiles are usually equipped with an optical target tracking device containing a homing head on the front tip of the guided missile. The homing head is equipped with a camera that images the target to be reached, such that the guided missile can track the target with the aid of image processing. For high-resolution target acquisition, the field of view of the camera is generally small and has a diameter of only a few angular degrees. In order nevertheless to be able to acquire an extended region of an object scene, the field of view can be pivoted, e.g. about a rolling axis and a pitch axis of the guided missile, such that it can be directed into a region of interest in the object scene. For this purpose, the camera contains an optical articulation by which the beam path can be directed into the region of interest in the object scene or is guided from said region onto the detector.

Published, non-prosecuted German patent application DE 10 2009 029 895 A1, corresponding to U.S. patent publication No. 20100327105, discloses a homing head of a guided missile, wherein a prism arrangement forms an optical articulation. When the field of view of the detector of the homing head is pivoted, the prism right at the front of this arrangement together with an input optical unit is concomitantly pivoted with the field of view, wherein the subsequent prisms are stationary in a structurally fixed manner or are concomitantly moved with a rolling frame. Published, non-prosecuted German patent application DE 10 2008 026 990 A1 discloses an optical articulation which dispenses with prisms and achieves a squint angle of ±90° by use of mirrors.

The image recording of the camera can easily be impaired by spurious light, e.g. by insolation reflected at components of the camera, or by defensive radiation from the target, e.g. a laser. Particularly in the case of infrared cameras, there is additionally the problem that heat emitted by components of the camera passes to the detector of the camera and disturbs the images thereof.

SUMMARY OF THE INVENTION

It is accordingly an object of the invention to provide an optical device which overcomes the above-mentioned disadvantages of the prior art devices of this general type, which has a large optical squint angle and affords good protection against spurious radiation.

With the foregoing and other objects in view there is provided, in accordance with the invention an optical device for forming a beam path between an optical end element at a beam path end and an object scene into which the beam path is directed via a field of view of the optical end element. The optical device contains an alignment device for pivoting the field of view relative to a predetermined direction, an end optical unit, an optical articulation for guiding the beam path from a pivoted field of view into the optical end element. The optical articulation having an entrance aperture and an exit aperture and a shielding unit containing a shielding element leading partly around said optical articulation. The shielding unit shields the optical articulation against incident radiation that is not incident through the entrance aperture or the exit aperture of the optical articulation.

This object is achieved by an optical device of the type mentioned in the introduction, which according to the invention has a shielding unit containing a shielding element led partly around the optical articulation, which shielding unit shields the optical articulation against incident radiation that is not incident through the entrance or exit aperture of the optical articulation, in particular against all incident radiation that comes from outside the shielding unit and is not incident through the entrance or exit aperture of the optical articulation.

The invention is based on the consideration that a cold screen around an aperture of the optical device protects an infrared detector in particular against thermal radiation from internal components of the device and against defensive radiation it is possible to use a screen in the beam path, but such measures do not help against disturbing radiation incident in the optical articulation. Precisely the use of at least one prism for the optical articulation leads especially to such susceptibility to disturbance, since a prism is a particularly sensitive region with regard to the undesirable coupling of undesirable radiation into the beam path. Therefore—if appropriate in addition to a cold screen and laser screen—a shielding around the optical articulation having a prism, but also having other optical articulation elements, is particularly advantageous. Of course, the shielding does not have to relate to the radiation emitted by the shielding unit itself, in particular infrared radiation, but rather only to externally incident radiation, in particular from outside the shielding unit.

The optical device can be prepared for guiding radiation from an object scene to a detector, e.g. part of a camera for imaging the object scene onto the detector. In this respect, the optical device can be or contain a pivoting attachment for a camera lens. The end optical unit can be a detector optical unit that brings about the imaging of the field of view of the object scene onto the detector. The beam path end can then lie on the detector.

It is likewise possible and advantageous that the optical device can be an active device for emitting radiation, which is directed into a specific position of the object scene as a result of the pivoting of the field of view or of the optical articulation. If appropriate, a detector can be dispensed with. The end optical unit can be a beam modeling optical unit, e.g. for shaping a laser beam. The beam path end can then lie in the radiation source.

The field of view can be the input-related field of view of a detector, that is to say that visual range with which the detector "looks" into the object scene or which is imaged onto the detector. If a detector is absent, the field of view can relate to the emission field of a radiation source into the object scene.

The optical device can contain an input optical unit, which contains the first optical element on which radiation coming from the object scene impinges. The alignment device can be a mechanical device for pivoting an optical component, such that the field of view is pivoted, for example a device for pivoting the input optical unit, such that the latter can be directed onto an object of the object scene. The pivoting can be effected—very generally—relative to the detector or—even more generally—relative to a positionally fixed element, that is to say an element that is connected for example rigidly to a housing of the optical device, for example a missile outer shell.

The pivoting of the field of view is effected in a relative fashion, that is to say with respect to a predetermined direction. The latter can be a rolling axis, e.g. of the optical device, of a homing head or of a guided missile, an axis of symmetry or some other direction determined in advance. The pivoting of the field of view is, in particular, a pivoting about a pitch axis and can be effected with the aid of a rolling-pitching device by which the field of view, with or without an input optical unit, can be pivoted about a pitch axis within a pivoting angle range, for example +/−90 degrees. In addition, it is advantageous if the field of view, and/or an input optical unit, can be rotated about a rolling axis that is expediently an axis of symmetry of the optical device. In the case of a guided missile or a homing head therefor, the rolling axis is expediently the rolling axis of the guided missile. Advantageously, the rolling axis and the pitch axis intersect at the of a partly spherical entrance window of the device, for example of a dome of a homing head, at right angles.

When a detector is present, an image sensor is advantageous, for example a multi-element matrix detector. It is preferably arranged centrally and with its reception plane at least virtually at right angles with respect to the rolling axis. The detector optical unit is installed upstream of the detector. The detector and the detector optical unit are preferably mounted in a structurally fixed manner or in a manner fixed to the housing. However, it is also possible to mount the detector optical unit and, in particular, also the detector in rolling fashion, that is to say in a manner movable about the rolling axis with respect to a housing, for example in a rolling frame. The field of view can preferably be directed at all points of a half-space, for example the front half-space of a missile. For this purpose, it is preferably pivotable by +/−90 degrees about a pitch axis and preferably rotatable by 360° about a rolling axis, wherein rolling about a rolling axis given the presence of pitching pivoting can also be designated as pivoting. The field of view of the detector is expediently between ±2 degrees and ±10 degrees about a central direction.

The shielding unit expediently lies between a housing of the optical device, e.g. a homing head housing, and the optical articulation and shields the optical articulation from radiation that has penetrated into the housing. In this case, the shielding element should lie in a planar fashion around the optical articulation, advantageously around the entrance and exit surfaces of a prism of the articulation, at least the entrance and exit apertures of the articulation remaining clear. The entrance and exit apertures relate to the beam path running in the field of view. The entrance aperture can be the exit aperture of an optical unit arranged upstream, e.g. of an input optical unit, and the exit aperture can be the entrance aperture of a downstream optical unit, e.g. of a detector optical unit.

Furthermore, it is advantageous if the shielding element is mounted in a movable fashion with respect to the housing and/or with respect to the rolling frame structure, in particular also in a movable fashion with respect to the optical articulation, such that the movement of the shielding element can be independent of all these elements.

In one advantageous embodiment of the invention, the device comprises a pivoting element which concomitantly pivots with a pivoting of the field of view, one side of the shielding element being coupled with a movement of the pivoting element and another side being mounted in a structurally fixed manner. In this way, the shielding element can protect against radiation that enters between this element. Expediently, the pivoting element concomitantly pivots with the field of view at the same angle. It can be the input optical unit or some other element. The other side can be the opposite side. The structurally fixed mounting can be a mounting fixed to the housing. A mounting fixed to a rolling frame is particularly advantageous. The term structurally fixed includes a rigid fixing to a rolling frame.

Advantageously, the shielding element is mechanically forcibly coupled in terms of its movement with a movement of an input optical unit. The shielding element can thus be reliably carried along with a movement of the input optical unit. Furthermore, it is advantageous if, in this case, a force flux for the movement is led via an element acting on the input optical unit. In this way, the input optical unit or the element acting thereon can bring about the movement of the shielding element and, in particular, its surface variation. A force flux can run from a housing or a rolling frame via the element to the shielding element.

In addition, it is proposed that the shielding element be variable in terms of its shielding surface area. In this case, the surface area relates to the shielding surface. A surface region around the optical articulation that becomes larger and smaller with a pivoting can thus be effectively shielded. Expediently, the shielding additionally contains at least one variation device which is prepared for generating a variation of the shielding surface area that is coupled to a pivoting of the field of view.

A variation of the shielding surface can be achieved in a particularly simple manner if the shielding unit has at least one unwinding device and the shielding element can be unwound.

It is furthermore advantageous if the device has a surface dispenser that can issue shielding surface of the shielding element. It is expediently prepared for correspondingly issuing additional shielding surface of the shielding element when the field of view is pivoted. The surface dispenser can be a roll onto which the shielding element is partly wound up.

A good adaptation of the shielding element to a required shielding surface can be achieved if the shielding element is a film. A metal film is particularly suitable since it can also shield radar radiation that is used for image interference.

Moreover, it is proposed that the shielding element be mounted such that it is placed onto a support in a manner free of slipping when the field of view is pivoted. A force expenditure for moving the shielding element can thereby continue to be kept small.

Furthermore, it is proposed that the shielding unit have a drive that drives a movement of the shielding element from a structurally fixed side of the shielding element. In this way, a movement can be conducted rapidly and with little force. The structurally fixed strength expediently relates to a housing-rigid, in particular a rolling-frame-rigid fixing. The drive expediently acts on the shielding element on the structurally fixed side.

Stress on the shielding element can be kept small if the drive is embodied such that it keeps the shielding element free of tension during the movement thereof.

It is particularly advantageous if the shielding unit has a roll, on which the shielding element is partly rolled up, and the drive drives a rotation of the roll. If the rotation is independent of a tension of the shielding element on the roll, then the shielding element is subjected to only slight loading.

A good movement guidance of the shielding element can be achieved if the drive is forcibly coupled with a movement of an input optical unit.

A simple and reliable embodiment of the drive consists in the fact that the drive has a gearwheel which meshes with a gearwheel which is rigidly coupled with the field of view. The rigid coupling can also be effected with the input optical unit.

A further advantageous embodiment of the invention provides for the shielding unit to have a frame led around the articulation and having an opening for leading the beam path through it, and the shielding element to be mounted such that it is placed onto the frame in a manner free of slipping when the field of view is pivoted. The freedom from slipping makes it possible to achieve an exact guidance of and low stress on the shielding element.

The invention is particularly suitable in connection with an optical articulation having a reversing prism having an entrance surface, an exit surface and a reflection surface. In this case it is advantageous if the shielding element is partly led both around the entrance surface and around the exit surface, such that both surfaces can be protected against undesirable incident radiation. The reversing prism can be arranged such that beams running in the optical axis of the articulation are refracted towards the reflection surface of the reversing prism and are reflected by the reflection surface.

With a reversing prism, the optical properties of a mirror and of a prism can be combined with one another. It makes it possible for a beam arriving from the front to be passed on optically towards the rear, which would not be possible with a simple mirror, and it makes it possible to realize a squint angle or pivoting of the field of view of ±90 degrees or more. A serial arrangement of a plurality of mirrors or prisms is not necessary, for which reason a very compact design of the optical articulation can be achieved.

The reversing prism can have a hypotenuse surface aligned parallel to the optical axis. In this case, the alignment of the optical axis can relate to the beam path upstream of the reversing prism, that is to say between the object scene and the reversing prism. The parallelism expediently occurs with the field of view not having been pivoted. In this way, it is possible—using the hypotenuse surface as a mirror surface—for a beam entering into the reversing prism from the front to be led out from the reversing prism in the same direction towards the rear, thereby enabling a deflection—unchanged in the beam direction—of the beam from the reversing prism, in association with an image mirroring which, however, is of no significance for the beam direction.

A pivoting of the field of view by ±90 degrees can be made possible in a particularly simple manner if the optical articulation has two reversing prisms which act identically in the beam path and which are expediently arranged alongside one another, one above the other or generally: adjacent, in the beam path. Radiation from the object scene can simultaneously be directed onto the two reversing prisms, which are advantageously arranged in parallel fashion in the sense of not serially. The two prisms can be arranged in a plurality of ways with respect to one another, and can expediently be stacked one on top of another. However, if the two reversing prisms adjoin one another at their hypotenuse surfaces, then it is possible to create a particularly compact optical articulation with a high radiation efficiency. A particularly compact arrangement can be achieved if the two reversing prisms lie with their reflection surfaces one on top of the other. In this case, they can form an optical cube.

Furthermore, it is advantageous if both reversing prisms—in conjunction with the detector optical unit—in each case image an overall image of the object scene onto the detector. These overall images lie one above another, such that a point on the object scene is imaged by both reversing prisms onto the same point at the detector.

The optical articulation contains one reversing prism, although a plurality of reversing prisms, in particular two reversing prisms, are also advantageous, which are expediently stacked one on top of another. In this case, the reflection surfaces are expediently arranged parallel to one another. Advantageously, all the optical properties of the optical articulation are achieved just by the at least one reversing prism, such that additional components can be dispensed with. Furthermore, it is advantageous if the reversing prisms of the optical articulation are arranged rigidly with respect to one another, such that the optical pivoting properties occur as a result of the prisms which are rigid with respect to one another. In this way, the mechanics of the optical articulation can be kept simple. The optical axis of the optical articulation can be parallel to the central axis of the beam bundle incident from the field of view or aligned by the articulation.

The reversing prism is a prism having at least one reflection surface at which the beam path is at least partly specularly reflected. It is preferably a single prism having an entrance surface, at least one reflection surface different from the latter, and expediently having an exit surface different from the two first-mentioned surfaces. A roof edge prism is particularly suitable, in particular a dove prism. The reversing prism is expediently arranged in the optical device such that the beam path is specularly reflected only once at only one reflection surface. The mirror surface is preferably a hypotenuse surface of the prism; it is expediently reflectively coated, but the reflective coating is not necessary. It is particularly advantageous if the ridge line of the reversing prism runs parallel to the pitch axis. It is additionally beneficial for compactness if the pivoting axis or the pitch axis runs parallel to the hypotenuse surface, in particular lies in the hypotenuse surface.

In the reversing prism, a parallel beam bundle incident in a front roof surface is expediently refracted towards the hypotenuse surface, reflected there and refracted again at the rear roof surface and thus output as a mirrored beam bundle. Expediently, the other optical beam properties remain unchanged. In this way, the rear beam bundles thus obtained can be introduced into a customary detector optical unit without further optical measures. If the reversing prism is pivoted by rotation of the pivoting axis or pitch axis perpendicular to the rolling axis, then, from the point of view of the detector, the beam bundles at the input of the prisms are rotated by twice the angle on account of the mirroring in the prism. A mechanical prism tilting by 45 degrees thus generates the required or advantageous optical squint angle tilting by 90 degrees.

The material of the reversing prism is dependent on the radiation frequency used. Expediently, the detector is an infrared detector and the material of the reversing prism is a material transparent to infrared radiation, in particular silicon. The form of the reversing prism, in particular the angle of two roof surfaces and a hypotenuse surface of the reversing prism with respect to one another, can be made dependent on the refractive index and thus on the radiation frequency and the material. In particular, the diameter of the field of view is taken into account in the choice of geometry of the prism, since a large field of view is associated with a large beam divergence, including in the prism. Thus, advantageously, all beams incident in the reversing prism—including at different angles of incidence in accordance with the extent of the field of view—should be led out from the reversing prism again in the direction of the detector objective.

A further advantageous embodiment of the invention provides for the pivoting axis of the pivoting of the field of view to run through a center of symmetry of the optical articulation. The center of symmetry can be a geometrical midpoint, a geometrical center of a mirror plane, a center of gravity, a midpoint of a line of intersection of two planes of symmetry or the like. By virtue of this arrangement, the optical articulation can be kept particularly compact.

In principle, the advantage of a large entrance aperture of the device is at odds with the desire for a compact design. Nevertheless, in order to achieve an entrance aperture of the device which is larger than the entrance aperture of the optical articulation, it is advantageous to provide an input optical unit upstream of the optical articulation. The input optical unit is expediently embodied such that it compacts the beam path incident from the object scene, with the result that the beam path passing through the entrance aperture of the input optical unit is therefore compacted in the exit aperture, and the exit aperture is, for example, smaller than the entrance aperture. As a result, the compacted beam path can be directed directly onto the optical articulation, which can be kept small as a result. In this way, a large entrance aperture of the optical device can be combined with a compact design of the optical articulation.

The compaction of the input optical unit is expediently effected by a factor of 1.2 to 10, in particular. The factor expediently relates to the diameter ratio of the entrance aperture to the exit aperture of the input optical unit. Expediently, the input optical unit is the first optical device of the device into which the beam path coming from the object scene in an unchanged manner impinges first, if appropriate apart from an entrance window, for example a homing head dome.

An input optical unit upstream of the optical articulation, that is to say between the optical articulation and the object scene, is expediently afocal, such that a parallel beam incidence from the object scene is directed onto the optical articulation in parallel fashion. As a result, image aberrations caused by the pivoting can be kept small or even avoided.

Furthermore, it is proposed that the input optical unit compensate for optical properties of an entrance window that effects mechanical shielding from the surroundings, for example of a homing head dome. The compensation expediently takes place such that an afocal nature with respect to the optical articulation is maintained. Within the meaning of such an afocal input optical unit, the entrance window can also be understood as part of the input optical unit.

In order to avoid image disturbances caused by a pivoting, it is furthermore advantageous if the optical articulation is afocal. This makes it possible for the beam path to be parallel both upstream and downstream of the optical articulation.

The optical articulation tracks a beam path to a pivoting of the field of view such that the field of view remains imaged onto the detector. The size of the imaging, for example a planar image or else just a point, is very important in this case. For the purpose of optical tracking, the optical articulation is expediently provided with a rotation device for rotating at least one part of the optical articulation, in particular the entire optical articulation. Advantageously, the latter is embodied such that the optical articulation is concomitantly pivoted with always half the pivoting angle of the field of view. In this case, all optical elements of the optical articulation are expediently rotated synchronously. The axis of rotation of the rotating process is expediently the pivoting axis during the pivoting of the field of view. The rotation device can be a rotation drive. However, it already suffices if it has a bearing that serves for rotating the articulation.

The alignment device and the rotation device can be moved in a manner driven separately from one another, a synchronization of the movement being expedient for the positional constancy of the imaging of the field of view onto the detector. A particularly simple synchronization can be achieved if the alignment device and the rotation device are mechanically forcibly coupled. Such a forcible coupling can be effected by a gear mechanism for example.

Mechanical loads during such a forcible coupling can be kept small if a force flux for rotating the articulation is led via the alignment device into the rotation device. Since the alignment device rotates with twice the angle with respect to the rotation device, the rotation is thereby stepped down, which is mechanically protective.

Furthermore, it is advantageous if an input optical unit and the optical articulation are in each case mounted independently of one another in terms of their movement for the pivoting of the field of view. The mounting can be effected in a rolling frame, such that both elements are rollable.

In a particularly simple manner, a parallel beam path can be produced upstream and downstream of the optical articulation. The parallelism relates to beams incident in the entrance aperture of the optical device in parallel fashion. Owing to a planar field of view, not only parallel beams are present, of course, but this non-parallelism is not at odds with the term parallel beam path as used here.

The invention is additionally directed to a homing head for a guided missile containing an optical device as described above. Expediently, the homing head contains a partly spherical entrance window in the form of a dome having a sphere center. The homing head can be embodied particularly compactly or with high luminous intensity if the pivoting axis of the pivoting of the field of view runs through the sphere center. In particular, the center of symmetry of the optical articulation is also arranged in the sphere center.

The invention is additionally directed to a guided missile containing a homing head as described above.

Further advantages will become apparent from the following description of the drawing. Exemplary embodiments of the invention are illustrated in the drawing. The invention is not restricted to these exemplary embodiments—including with regard to functional features—nor should the exemplary embodiments be considered as separate from one another. The description of advantageous configurations of the invention as given above contains numerous features which are reproduced in the individual dependent claims in a manner combined in part as a plurality. However, the person skilled in the art will also consider these features individually and combine them to form expedient further combinations. In particular, these features can be combined in each case individually and in any suitable combination with the device according to the invention in the independent claim. The same applies to features of any exemplary embodiment in the following description of figures which are considered explicitly in isolation and can be combined with the device according to the invention.

Other features which are considered as characteristic for the invention are set forth in the appended claims.

Although the invention is illustrated and described herein as embodied in an optical device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages

DETAILED DESCRIPTION OF THE INVENTION

Figure 1:
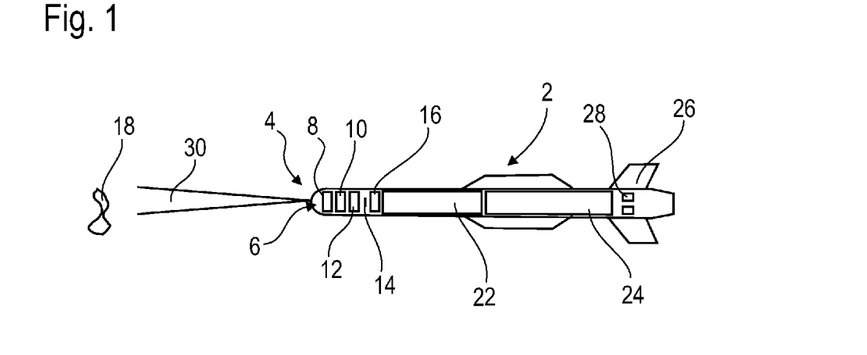
FIG. 1 is a diagrammatic, side view of a guided missile having a homing head according to the invention.

Referring now to the figures of the drawing in detail and first, particularly, to FIG. 1 thereof, there is shown a guided missile 2 containing a homing head 4, which has an optical device 6 containing an input optical unit 8, an optical articulation 10, a detector optical unit 12, and a detector 14. In this exemplary embodiment, the detector optical unit 12 serves as an end optical unit and the detector 14 serves as an end element within the meaning of the invention. A control unit 16 of the guided missile 2 serves for controlling the movable parts of the optical device 6 and for carrying out an image processing of images of an object scene 18 that was imaged onto the detector 14 by the optical device 6. Moreover, the guided missile 2 contains a warhead 22, a rocket motor 24, a tail assembly 26, which is moved by actuators 28 driven by the control unit 16 on the basis of signals of the image processing.

Figure 2:
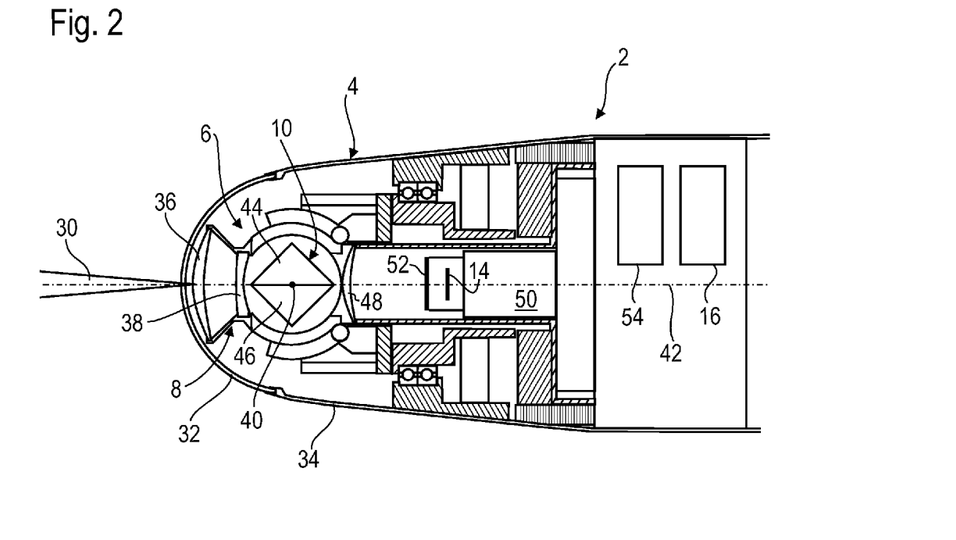
FIG. 2 is a sectional view of the homing head of the guided missile from FIG. 1.

A schematic sectional drawing in a plan view of the homing head 4 is illustrated in FIG. 2. The homing head 4 is equipped with a transparent dome 32, composed of sapphire, for example, which is fixedly inserted into an outer shell 34 of the guided missile 2. The optical device 6 is arranged behind the dome 32, wherein the dome 32 can be regarded as part of the optical device 6 or a separate unit. The input optical unit 8 is equipped with two lenses 36, 38, which can jointly be pivoted about a pitch axis 40 and rotated about a rolling axis 42 of the guided missile 2. The pivotability about the pitch axis 40 is ±90 degrees, such that the field of view 30 of the optical device 6 or of the detector 14 can be pivoted into the entire front half-space. The size of the rectangular field of view of the detector 14 is approximately 3°×3°, the field of view 30 thereof into the object scene 18 through the input optical unit 8 being circular ±3° and thus having a diameter of approximately 6°.

The optical articulation 10 contains two reversing prisms 44, 46, which are placed onto one another in each case at their hypotenuse surface. The two reversing prisms 44, 46 together form an optical cube, which likewise can be pivoted about the pitch axis 40 and can be rotated about the rolling axis 42.

A detector optical unit 10 illustrated schematically by a lens 48 is arranged between the optical articulation 10 and the detector 14, and images the excerpt from the field of view 30 of the object scene 18 onto the detector 14. The detector 14 is an infrared detector that is sensitive in the medium infrared. However, any other spectral sensitivities are also possible and advantageous. A cooler 50 is present for cooling the detector 14, the cooler window 52 of the cooler being arranged between the detector optical unit 12 and the detector 14. An inertial measurement unit 54 and the control unit 16, which are in each case only indicated schematically, are arranged in the rear region of the homing head 4.

The detector 14 is embodied as an image sensor in the form of a matrix detector having a multiplicity of detector elements arranged in matrix form, the surface center of which lies on the rolling axis 42 and thus at any pitching angle always on the optical axis, that is to say in the center of the field of view 30.

Figure 3:
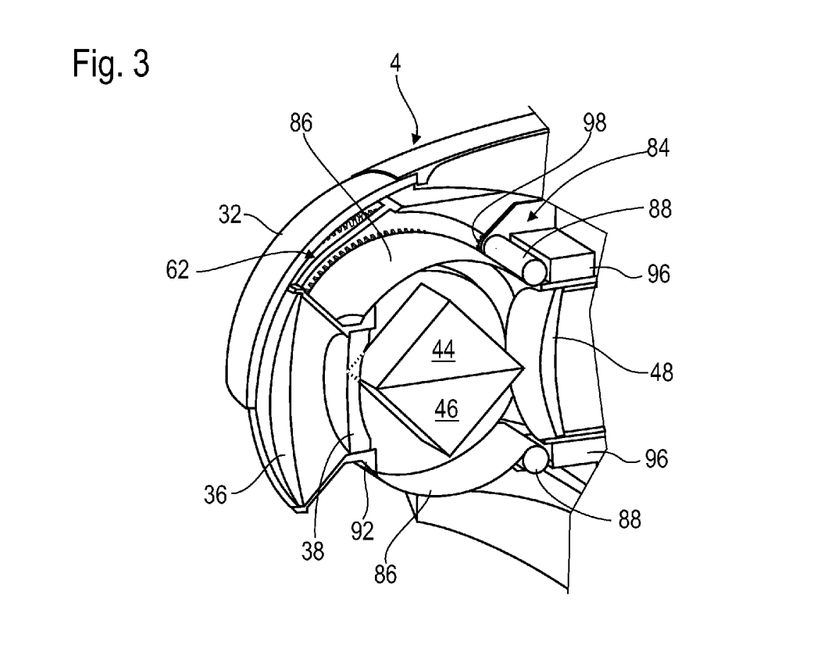
FIG. 3 is a perspective view of an input optical unit and an optical articulation of the homing head from FIG. 2, including a shielding unit.

FIG. 3 shows a slightly schematically depicted perspective view of the front part of the homing head 4. The illustration is depicted in accordance with FIG. 2 in a perpendicular section, such that the two reversing prisms 44, 46 and the lenses 36, 38, 48 are illustrated sectionally in the center. Further details in the lower region of the homing head 2 are omitted, as is the lower half of the dome 32.

Figure 4:
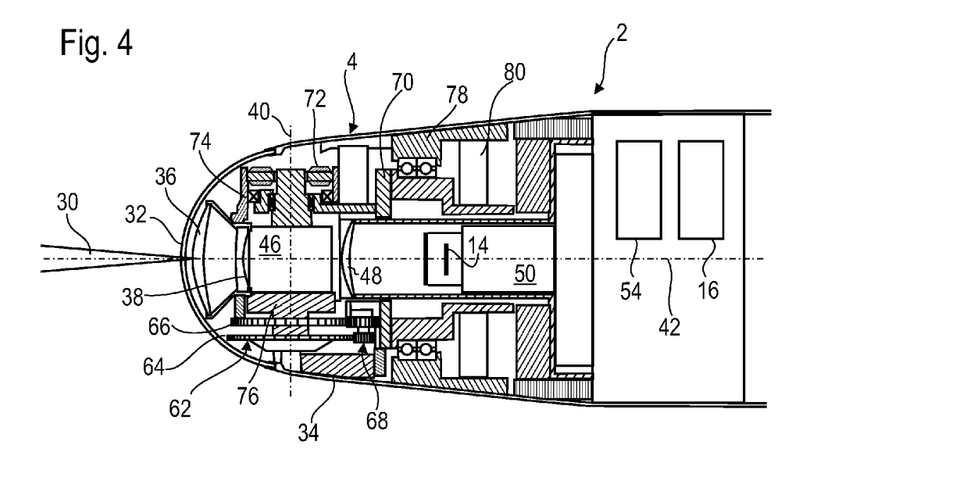
FIG. 4 is a plan, sectional view of the homing head from FIG. 2.

FIG. 4 illustrates the homing head 4 in a sectional view from below, such that the view looks at the reversing prism 46 from below, for example, with respect to the optical articulation 10.

The optical elements and the beam path are now described.

With reference to the sectional view drawing from FIG. 2 and the beam path drawings from FIGS. 5, 6 and 7, an explanation is given below of the optical imaging of objects from the object scene 18 onto the detector 14. Radiation to be detected comes from the viewing scenario of the homing head 4 with background and target objects which become situated in the field of view 30. The field of view 30 is aligned during operation by rotation of individual optical elements by a rolling-pitching frame system. The alignment is effected, for example by a pilot of an aircraft carrying the guided missile or by a radar of the carrier aircraft. The used angle of the entrance radiation varies in the viewing angle range of the optical system by approximately ±3 angular degrees with respect to the central optical axis thereof, the line of sight of the homing head 4. Thus, and owing to the relatively wide optical working distance during the target identification and target tracking by the homing head 4, the objects of the scenario are imaged from almost parallel radiation onto the detector 14.

Figure 6:
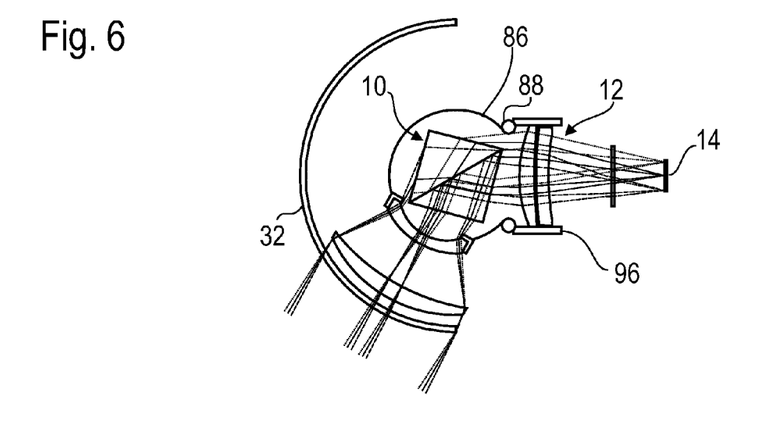
Figure 7:
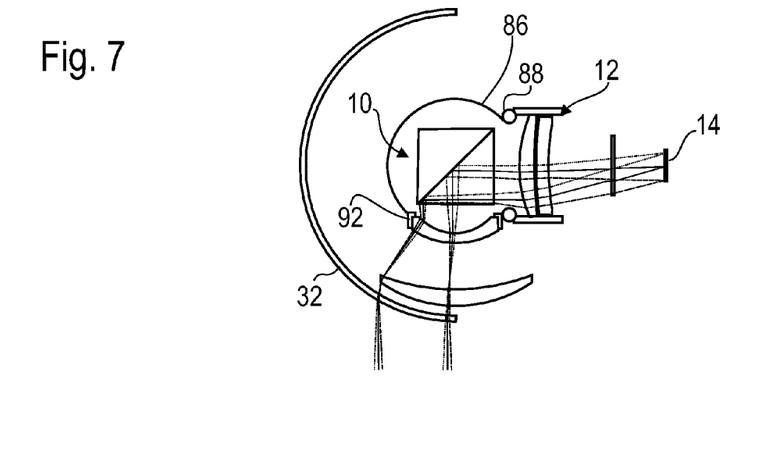

The entrance aperture of the input optical unit 8 pivotable about the pitch axis 40 and rolling axis 42 is determined by the opening of the entrance lens 36 but also by the shading of the dome edge at large squint angles, as is illustrated in FIG. 7. Up to a pitching deflection of 60° from the rolling axis 42, which is the axial direction of the guided missile 2, no dome shading takes place, as can be seen in FIG. 6. The full entrance aperture of the entrance lens 36 can be used. Starting from pitching angle deflection of approximately 60°, the dome shading begins, which increases to approximately 50% up to pitching angle deflection of 90°. In the case of such a large pitching angle deflection, this fundamental effect brings about an acquisition range of the homing head 4 reduced by approximately 30%. For the symmetrical dome 32 in the shape of a sphere section, this applies to any position or alignment of the field of view 3 about the rolling axis 42 with corresponding pitching angles.

The input optical unit 8 is embodied as a thermally stable afocal unit, that is to say that it is an afocal optical unit. A parallel beam path, illustrated by solid lines in FIGS. 5 to 7, is thus guided through the input optical unit 8 in parallel fashion to the optical articulation 10. However, the beam path is compacted, by the diameter factor 2 or area factor 4 in the exemplary embodiment shown, other such ratios of entrance aperture to exit aperture between 1.2 to 10 also being conceivable and advantageous. It is particularly advantageous, therefore, that the entrance optical unit 8 converts the entrance radiation into an optically equivalent, but compacted beam bundle. Depending on the dome 32, it is in this case possible and, if appropriate, advantageous to compensate for the optical effect of the dome 32, such that the afocal unit and the equivalent conversion relate to the entrance radiation upstream of the dome 32. From an optical point of view and the point of view of balancing and mass inertia, lightweight lenses 36, 38 are advantageous, for example composed of silicon.

The beam bundle is deflected by the prism block arranged symmetrically in the dome center and rotatably about the pitch axis 40 and rolling axis 42, the prism block forming the optical articulation 10 with regard to the optical elements. Its two identical and isosceles reversing prisms, dove prisms in this exemplary embodiment, are placed onto one another congruently in each case at their hypotenuse surface 56. The transverse axes of the hypotenuse surface 56 thus lie on the pitch axis 40 and the surface center of the hypotenuse surface 56 lies in the dome center, in which the pitch axis 40 and the rolling axis 42 also intersect. The center of symmetry of the optical articulation 10 lies in the pivoting axis or pitch axis 40.

Incident beams are refracted at the entrance surface 58 of the two reversing prisms 44, 46 towards the hypotenuse surface 56 and reflected there to the exit surface 60, in which the beams leave the reversing prism 44 and respectively 48 again. In this case, the hypotenuse surfaces 56 of the prisms 44, 46 can be reflectively coated in order to increase a reflection proportion. The reflective coating can be advantageous for use in specific spectra. With the field of view not having been pivoted, the hypotenuse surfaces 56 are aligned parallel to the optical axis of the beam path upstream of the optical device 6 and parallel to the optical axis of the beam path upstream of the optical articulation 10.

On account of the known optical operative function of a dove prism, the beam bundle is directed from the input optical unit 8 via both reversing prisms 44, 46 exactly with twice the angle with respect to the incident beam direction about the pitch axis 40 and in a direction longitudinally with respect to the rolling axis 42. In this case, the incident pupil bundle falls onto both prisms 44, 46 and is thereby split, mirrored and output in an optically offset fashion. The imaging optical properties are maintained in both resulting beam bundles, however, such that two congruent imagings of the field of view scenario are ultimately generated on the detector 14. If the field of view 30 is aligned parallel to the rolling axis 42 and thus to the axis of symmetry of the optical device 6, then the incident pupil bundle is split between the two reversing prisms 44, 46 exactly half each. This is represented in FIG. 5. As the pitching angle increases, the incident pupil bundle is imaged more and more asymmetrically onto only one of the reversing prisms 44, 46, in which case, given a pitching angle of 90°, the pupil bundle is only imaged completely onto one of the reversing prisms 44, 46, as illustrated in FIG. 7.

The two reversing prisms 44, 46 are formed from silicon and are thus distinguished by a refractive index that is very favorable in the infrared, and by thermal stability. What is furthermore advantageous is the low weight, which is advantageous for application in missiles.

The detector optical unit 12 is an imaging optical unit which could also be used without the input optical unit 8 and the optical articulation 10 for the imaging of the object scene 18. In this respect, the three optical units input optical unit 8, optical articulation 10 and detector optical unit 12 can be used independently of one another. They are also thermally passivated independently of one another.

The mechanical construction is now described.

The angle doubling of the optical articulation 10 requires that the prism block may only ever be rotated by half the pitching angle relative to the entrance optical unit 8—proceeding from the zero position of the frame system parallel to the rolling axis 42, that is to say in the case of a squint angle of 0°, up to the maximum pitching deflection. For this purpose, the input optical unit 8 is mounted rotatably in a mechanically separated fashion relative to the optical articulation 10 on the pitch axis 40. In this case, a 2:1 coupling of the angles of rotation can be effected by a separate rotational driving of the two elements. In the exemplary embodiment shown, however, the mechanical coupling is effected by a gear mechanism 62, in particular a gearwheel mechanism (see FIGS. 3 and 4). The gear mechanism 62 contains a first gearwheel 64 and a second gearwheel 66, which are connected to one another by two spur gears 68 fixedly coupled to one another. The first gearwheel 64 is rigidly connected to the prism block and the second gearwheel 66 to the input optical unit 8. By means of the gear mechanism connection of the spur gears 68, the two gearwheels 64, 66 are rigidly connected to one another in a rotation ratio of 2:1.

In this exemplary embodiment, the pitch movement drive both of the input optical unit 8 and of the optical articulation 10 is effected by an electromagnetic direct drive 72, which is supported on the rolling frame 70. The drive 72 is illustrated opposite the gear mechanism 62 in FIG. 4 but it is possible to integrate it in the gear mechanism 62. In the exemplary embodiment shown, the drive 72 drives the pitch movement of the input optical unit 8 directly and of the optical articulation 10 indirectly via the pitch movement of the input optical unit 8. In this case, a force flux takes place from the rolling frame 70 via the drive 72 to a supporting structure 74 of the input optical unit 8 and from there via the gear mechanism 62 to a supporting structure 76 of the optical articulation 10. By means of the angular coupling, the force flux is stepped down by the ratio 2:1 by the gear mechanism 62, as a result of which the mechanical system and in particular the gear mechanism 62 can be operated with little wear. The optical articulation 10 or the supporting structure 76 thereof can also be mounted on the input optical unit 8 or the supporting structure 74 thereof. In the exemplary embodiment shown, however, these two elements are mounted separately and independently of one another, that is to say not one above another, in the rolling frame 70.

The drive 72 can be regarded as the alignment device for the pivoting of the field of view 18. The mounting of the supporting structure about the pitch axis 42 can also be understood as alignment device. The rolling frame 70 is mounted rotatably about the rolling axis 42 with respect to a housing structure 78, which is connected fixedly and rigidly to the outer shell 34 of the homing head 4 or of the guided missile 2. In this case, the rolling drive is effected by a direct drive 80 between the rolling frame 70 and the housing structure 78. Since the input optical unit 8 and the optical articulation 10 are mounted in the rolling frame 70, they are also rotatable about the rolling axis 42.

Figure 8:
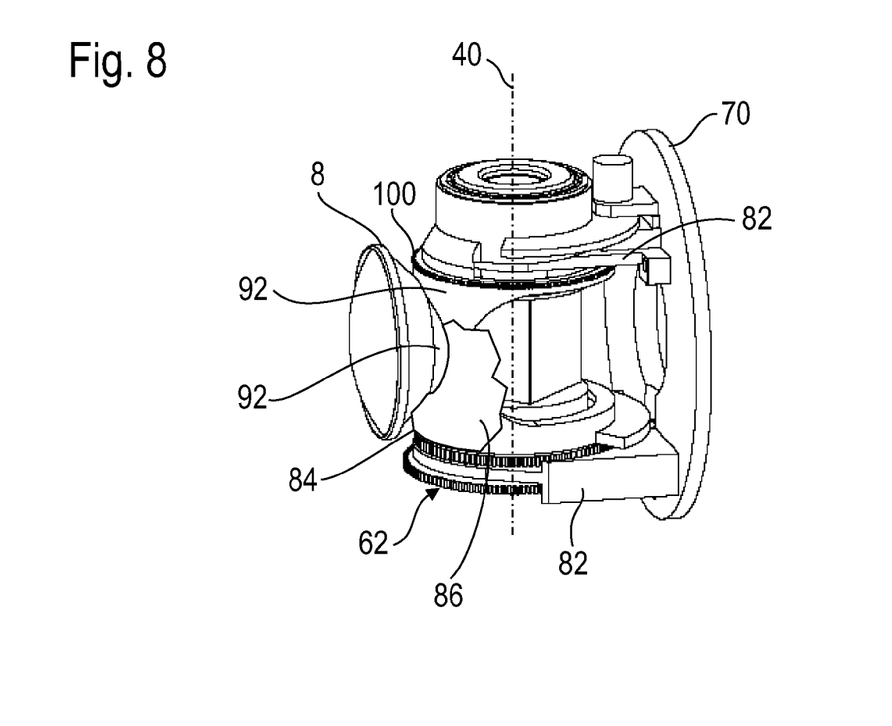
FIG. 8 is a perspective view of a shielding unit around the optical articulation of the homing head.

The rolling frame 70 or the structure plate thereof is illustrated perspectively in FIG. 8. The left-hand part of the figure illustrates the input optical unit 8, which is held in the rolling frame 70 by a bearing fork 82 integrally formed onto the rolling frame 70 and is mounted pivotably about the pitch axis 40. The prism block can be discerned in the interior of the bearing fork 82, the prism block being connected to the lower fork limb via the gear mechanism 62 visible at the bottom on the axis.

The shielding is now described.

By virtue of the open prism structure of the optical articulation, the optical articulation 10 and also the entrance lens 48 of the detector optical unit 12 are protected only inadequately against external radiation and internal stray radiation. Therefore the optical device 6 is protected by a shielding 84, led around the optical articulation 10, against radiation which, although it has entered through the dome 32, has not entered through the entrance optical unit 8 into the optical device 6. The shielding unit 84 also shields against internal stray radiation.

The shielding unit 84 can be seen particularly well in FIGS. 3 and 8. It contains a shielding element 86 in the form of a metal film. In the exemplary embodiment shown, this metallic and flexible shielding strip is illustrated in a manner exactly halved in accordance with the sectional drawing in FIG. 3 and in a partly sectional fashion in FIG. 8, in order to make visible there the inner prism block and the pivoting element 92 lying below the metal film. The pivoting element being rigidly connected to the input optical unit 8 and the shielding element 86 bearing on the pivoting element. The pivoting element 92 is led around the articulation 10 at least in the rear region and is provided with an opening through which the beam path emerging from the articulation 10 can pass, to be precise at any operating angular position of the input optical unit 8. The shielding element 86 is rigidly fixed to the input optical unit 8.

The material of the shielding element 86 can vary depending on the application. The use of a metallic shielding element 86 is particularly advantageous since it is thereby also possible to shield interfering radar radiation that would pass through plastic, if appropriate.

The shielding element 86 is wound up in the case of integral embodiment around the optical articulation 10 on both sides or in the case of bipartite embodiment on at least one side on unwinding devices 88 in the form of rolls or a roll 88. The unwinding devices 88 are shown in FIG. 3 and omitted in FIG. 8. In the case of a pitching movement of the input optical unit 8, the shielding element 86 is rolled up or out. The unwinding devices 88 are mounted rigidly with respect to the rolling frame, in which the input optical unit 8 and the optical articulation 10 are also mounted.

Figure 5:
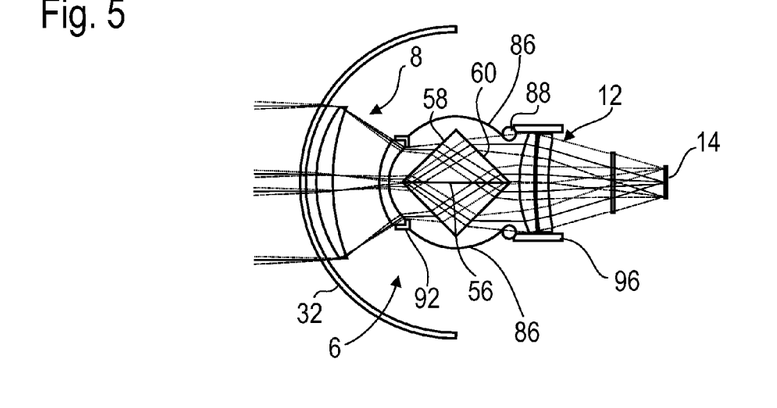
FIGS. 5-7 are illustrations showing beam paths through an optical device of the homing head in a case of the input optical unit directed towards a front, tilted obliquely to the side and tilted by 90 degrees.

The winding and unwinding of a shielding element 86 is illustrated schematically in FIGS. 5 to 7. The description is simplified by two shielding elements 86 being present. The latter are fixed to the pivoting element 92 at one of their ends and in the unwinding device 88 at their other end. The unwinding devices 88 are fixed to a holder 96, such that the optical articulation 10 is shielded from spurious radiation all around.

In the case of a field of view 30 directed straight ahead, that is to say in the case of a pivoting by 0° or no pivoting, both shielding elements 86 are drawn from the unwinding devices 88 to the same extent, such that their shielding surfaces are of the same size. In the case of a pivoting, as shown by way of example in FIG. 6, one shielding element 86 is unwound from its unwinding device 88 and the other is wound up to exactly the same extent, such that the total shielding surface remains the same. However, the shielding surface area of each shielding element 86 varies per se, such that the unwinding devices can be described as surface dispensers or variation devices for varying the shielding surface. Consequently, the surface dispenser correspondingly issues additional shielding surface of the shielding element 86 when the field of view 30 is pivoted.

To put it another way: the variation device generates a variation of the shielding surface area of its shielding element 86 that is coupled to a pivoting of the field of view 30.

In the case of a maximum pivoting, shown in FIG. 7, one shielding element 86 can be completely wound up, and the other is maximally rolled out.

It can be seen in FIG. 8 that the pivoting element 92 forms a frame led around the articulation 10 and having an opening for leading the beam path through it. When a shielding element 86 is unwound, it is placed onto the frame in a manner free of slipping. An unwound piece of shielding element 86 is placed onto the frame, such that pulling over the frame is obviated. The enlargement and reduction of the size of the shielding surface take place with very little friction as a result. A movement of the shielding element 86 which is displacement-free with respect to the pitching movement is achieved, as a result of which the shielding element is always carried along with the pitching movement with low forces and low wear.

In order that a loading of the shielding elements 86 is kept even smaller, each unwinding device 88 is equipped with a drive for driving a winding movement. The drive contains a gearwheel 98 that meshes with the gear mechanism gearwheel 66 of the input optical unit 8. In the case of a movement of the input optical unit about the pitch axis, that is to say a pivoting of the field of view, the gearwheel 66 drives the gearwheel 98 and hence winding of the unwinding device 88. In this case, the drive or the gearwheels 66, 98 are coordinated such that the winding speed precisely corresponds to the required surface variation, such that tension on the shielding element 86 is avoided. As a result of this mechanical coupling of pivoting element 92 and unwinding device 88 in the case of a pitching movement or pivoting of the field of view 30, the shielding element 86 is automatically concomitantly wound up or unwound in the case of a pitching movement.

In the exemplary embodiment illustrated, this mechanical coupling is effected via the gearwheel coupling, which can also be seen in FIG. 8. In this case, each unwinding device 88 is equipped on both sides with a spur gear 98, which meshes on a gearwheel 66, 100 of the gearwheel coupling which concomitantly rotates directly with the pitch rotation. Asymmetrical forces on the unwinding device 88 are avoided as a result of the double-sided drive. A rolling-up or unrolling of the unwinding device 88 is driven directly, without the need for force transmission via the shielding element 86, which therefore remains at least substantially force-free.

As a result of the rolling-up or unrolling, the shielding element 86 is an element that is variable in terms of surface area, a mechanical coupling to the input optical unit 8 bringing about a surface variation of the shielding surface that is coupled to a pivoting about the pitch axis. In this case, the shielding element 86 is mechanically forcibly coupled in terms of its movement with the movement of the input optical unit 8, a force flux for the movement of the shielding element being led via the input optical unit 8 or a pivoting element 92 acting thereon. As a result of the shielding 84, the optical articulation 10 is shielded against all incident radiation that is not incident through the entrance or exit aperture of the optical articulation 10.

As mentioned, the optical device 6 is characterized by three units 8, 10, 12 that are substantially independent of one another. In this respect, the distances between the units 8, 10, 12 in the longitudinal axis or rolling axis 42, or the axis of symmetry of the optical device 4, can be varied in terms of their distances with respect to one another. As a result of the parallel beam path, the optical mode of action of the elements 8, 10, 12 with respect to one another is not influenced in this case, but the beam divergence, caused by the extent of the field of view 30, should be taken into consideration. In this respect, the optical device 4 is particularly suitable for accommodating one or a plurality of functional modules which can be arranged between the individual elements 8, 10, 12 in the parallel beam path.

Figure 9:
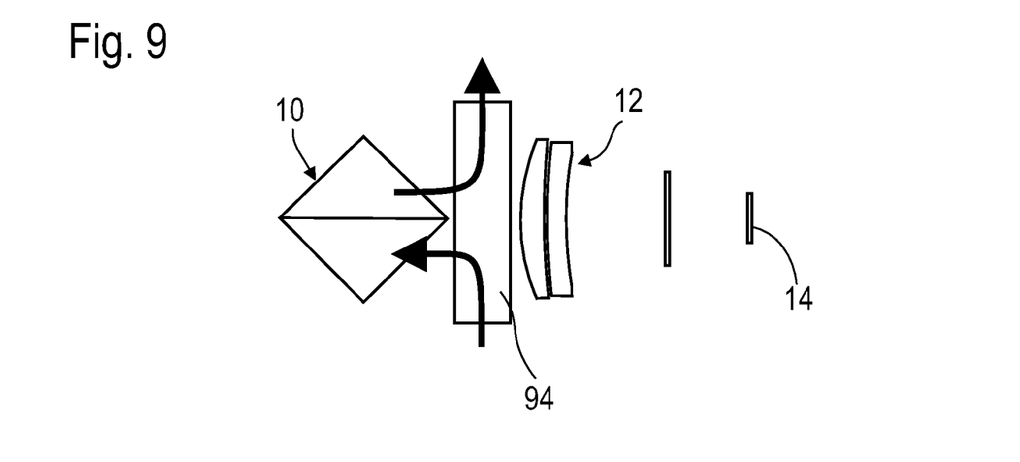
FIG. 9 is a schematic illustration of a functional element within the optical device.

Such an arrangement example is schematically outlined in FIG. 9. The functional module 94 is arranged between the optical articulation 10 and the detector optical unit 12. One particularly advantageous application of a functional module 94 is a glare shield, which can be introduced between the elements 10, 12 in the event of glare from outside or is permanently arranged there and is correspondingly activated. The required regulating command for a functional module 94 can be provided by the image evaluation in the homing head signal processing. This shielding is to be differentiated from the shielding unit 84, since this shielding is arranged in the beam path or in the field of view 30. By contrast, the shielding unit 84 always keeps the beam path or the field of view free and never engages therein.

However, other functional modules 94 are also conceivable. One such functional module 94 can be used for realizing an active temperature stabilization. An optically active element, for example a laser, is likewise possible. Beam splitters are also conceivable and advantageous, as are filters or other optical elements that influence the incident or outwardly directed beam path. Between the elements 8 and 10 and in particular between the elements 10 and 12 it is possible, with relatively little structural outlay, to input and output optical signals containing distance information, identification information or measurement information, for example, in the optically active field of view 30.

In the case of an arrangement between the elements 8, 10, 12, a parallel beam path is present which allows a simple optical influencing, e.g. a damping or spectral optical influencing. The parallelism relates to beams incident in the entrance aperture of the optical device in parallel fashion. Owing to the planar field of view 30, of course, non-parallel beams also pass from the object scene 18 into the entrance aperture, the non-parallelism of which is also reproduced between the elements 8 and 10, or 10 and 12. However, this non-parallelism is not at odds with the term parallel beam path as used here, which also relates to beams incident in parallel fashion. As a result of the parallelism of the beam path, therefore, a functional module 94 can be integrated there in a particularly simple manner and with minor requirements made of the functional module 94 and the adaptation of the optical device to the functional module 94.

The invention claimed is:

1. An optical device for forming a beam path between an optical end element at a beam path end and an object scene into which the beam path is directed via a field of view of the optical end element, the optical device comprising:
   an end optical unit;
   an optical link for guiding a beam into the optical end element, said optical link having an entrance aperture and an exit aperture;
   an alignment device for pivoting said optical link for changing the field of view relative to a predetermined direction; and
   a shielding unit containing a shielding element leading partly around said optical link, said shielding unit shielding said optical link against incident radiation that is not incident through said entrance aperture or said exit aperture of said optical link.

2. The optical device according to claim 1, further comprising a pivoting element which concomitantly pivots with a pivoting of said optical link for changing the field of view, one side of said shielding element being coupled with a movement of said pivoting element and another side being mounted in a structurally fixed manner.

3. The optical device according to claim 1, further comprising:
   a pivoting element; and
   an input optical unit, said shielding element being mechanically forcibly coupled in terms of its movement with a movement of said input optical unit.

4. The optical device according to claim 1, wherein said shielding unit has at least one variation device and said shielding element is variable in terms of its shielding surface area, said variation device for generating a variation of the shielding surface area is coupled to a pivoting of said optical link.

5. The optical device according to claim 1, wherein said shielding unit has at least one unwinding device and said shielding element is unwound via said unwinding device.

6. The optical device according to claim 1, further comprising a surface dispenser, which is prepared for correspondingly issuing additional shielding surface of said shielding element when the field of view is pivoted.

7. The optical device according to claim 6, wherein said surface dispenser is a roll onto which said shielding element is partly wound up.

8. The optical device according to claim 1, wherein said shielding element is a film.

9. The optical device according to claim 1, wherein said shielding unit has a drive that drives a movement of said shielding element from a structurally fixed side of said shielding element.

10. The optical device according to claim 9, wherein said drive keeps said shielding element free of tension during the movement of said shielding element.

11. The optical device according to claim 9, wherein said shielding unit has an unwinding device, on which said shielding element is partly rolled up, and said drive drives a rotation of said unwinding device.

12. The optical device according to claim 9, further comprising an input optical unit and said drive is forcibly coupled with a movement of said input optical unit.

13. The optical device according to claim 9, wherein said drive has a gearwheel which meshes with a gearwheel concomitantly moved with said optical link.

14. The optical device according to claim 1, wherein said shielding element is mounted such that said shielding element is placed onto a support in a manner free of slipping when the field of view is pivoted.

15. The optical device according to claim 1, wherein said shielding unit has a frame leading around said optical link and further has an opening for leading the beam path through it, said shielding element is mounted such that said shielding element is placed onto said frame in a slip-free manner when said optical link is pivoted.

16. The optical device according to claim 1, wherein said optical link has a reversing prism with an entrance surface, an exit surface and a reflection surface, said shielding element being partly led both around said entrance surface and around said exit surface.

17. A homing head for a guided missile, the homing head comprising:
   an optical end element defining a field of view; and
   an optical device for forming a beam path between said optical end element at a beam path end and an object scene into which a beam is directed via said field of view of said optical end element, the optical device containing:

an end optical unit;

an optical link for guiding a beam into said optical end element, said optical link having an entrance aperture and an exit aperture;

an alignment device for pivoting said optical link for changing the field of view relative to a predetermined direction;

a shielding unit containing a shielding element leading partly around said optical link, said shielding unit shielding said optical link against incident radiation that is not incident through said entrance aperture or said exit aperture of said optical link.

* * * * *